United States Patent
Snowden et al.

(10) Patent No.: US 6,397,519 B1
(45) Date of Patent: Jun. 4, 2002

(54) SOIL TREATMENT COMPOSITIONS AND THEIR USE

(75) Inventors: Jayne Anne Snowden, Keighley (GB); Tim David Stieber, McMinnville, OR (US)

(73) Assignee: Ciba Specialty Chemicals Water Treatments Limited, Bradford (GB)

( * ) Notice: Subject to any disclaimer, the term of this patent is extended or adjusted under 35 U.S.C. 154(b) by 0 days.

(21) Appl. No.: 09/568,267

(22) Filed: May 10, 2000

Related U.S. Application Data

(63) Continuation-in-part of application No. 09/491,376, filed on Jan. 26, 2000.

(51) Int. Cl.[7] ............................................. C09K 17/06
(52) U.S. Cl. ............................................................. 47/9
(58) Field of Search ....................................... 47/9, 58.1

(56) References Cited

U.S. PATENT DOCUMENTS

| | | | |
|---|---|---|---|
| 3,596,469 A | * 8/1971 | Higashimura | |
| 3,875,697 A | * 4/1975 | Bracke | .............................. 47/9 |
| 3,900,378 A | 8/1975 | Yen et al. | ............... 204/159.14 |
| 4,086,663 A | 4/1978 | Croft | ........................... 366/154 |
| 4,318,835 A | * 3/1982 | Clarke | ........................... 264/36 |
| 5,590,983 A | * 1/1997 | Angell | ......................... 405/263 |
| 5,672,656 A | * 9/1997 | Murayama et al. | .......... 524/831 |
| 6,000,625 A | 12/1999 | Cole | ............................. 239/10 |

FOREIGN PATENT DOCUMENTS

| | | | |
|---|---|---|---|
| GB | 2167398 | | 5/1986 |
| JP | 06057251 A | * | 3/1994 |
| JP | 407224280 A | * | 8/1995 |
| JP | 408149922 A | * | 6/1996 |
| JP | 409078050 A | * | 3/1997 |
| JP | 10191777 A | * | 7/1998 |
| JP | 410191777 A | * | 7/1998 |
| WO | 94/19095 | | 9/1994 |
| WO | 01/05878 A1 | | 1/2001 |

\* cited by examiner

*Primary Examiner*—Peter M. Poon
*Assistant Examiner*—Jeffrey L. Gellner
(74) *Attorney, Agent, or Firm*—David R. Crichton

(57) ABSTRACT

The invention provides an aqueous soil treatment composition comprising water and, (a) a calcium compound,
(b) a water-soluble anionic polymer which has intrinsic viscosity of less than 30 dl/g and is formed from water-soluble monomer or monomer blend of which less than 40% by weight is anionic monomer.

18 Claims, No Drawings

SOIL TREATMENT COMPOSITIONS AND THEIR USE

The present application is a continuation-in-part of U.S. Ser. No. 09/491,376 filed Jan. 26, 2000, pending.

This invention relates to compositions for soil treatment which can provide soil stabilisation benefits whilst being easy to handle using conventional equipment, and their use in irrigation methods.

It is well known to use high molecular weight polyacrylamides as additives within irrigation streams. These products are known to reduce soil movement therefore reducing erosion, increase water infiltration, and decrease the movement of soilborne pesticides and nutrients.

Solid grade products are commonly used in flood irrigation systems. These products are difficult to apply and are either added using complex applicators, which would usually be unavailable on a farm, or are hand applied by the patch method, in which case dose control is difficult.

Liquid products can be injected into the irrigation stream. Emulsions have been applied this way in overhead irrigation systems, as described in the granted patent U.S. Pat. No. 6,000,625. These products are viscous and require specialist pumps which are also not usually available on a farm. The polyacrylamide can also be applied as a solution in fertiliser, as described in the U.S. patent application Ser. No. 09/361,816. These fertiliser/polyacrylamide solutions have low viscosity's and can be injected into irrigation streams using standard equipment of the type commonly used to apply fertiliser solutions into irrigation streams. U.S. patent application Ser. No. 09/361,816 describes a method of applying polyacrylamides within nutrient solutions, however the polymers described are only suitable for formulation within essentially mono-valent based fertiliser solutions. These fertilisers act as carriers for the polyacrylamide and are not soil stabilisers themselves.

It is also well known that calcium compounds can be used as soil stabilisers, which also show effective water infiltration. Gypsum, calcium chloride and calcium nitrate are widely used for this application. It is also known that calcium plays an important role in the binding of polyacrylamide to soils, due to the calcium depositing on the aggregate surface and maintaining soil structure while facilitating bridging of the polyacrylamide between aggregates. Several trials have shown the synergy of polyacrylamide with calcium products when the two types of products are added separately, but used together.

It is possible to produce a dry blend of polyacrylamide and a calcium based formulation, however these formulations can not be easily applied with conventional farm based application equipment.

It would be desirable to apply a combined polyacrylamide and calcium formulation that displays a high activity due to synergy between the two components, through fertiliser injection systems as described in U.S. patent application Ser. 09/361,816. Such a formulation would need to be a solution or a stable dispersion that would cause no problems, such as clogging, through standard fertiliser systems.

According to the invention we provide an aqueous soil treatment composition comprising water and, (a) a calcium compound,
(b) a water-soluble anionic polymer which has intrinsic viscosity of less than 30 dl/g and is formed from water-soluble monomer or monomer blend of which less than 40% by weight is anionic monomer.

Preferably, the invention provides an aqueous composition in which the polymer (b) is dissolved. That is, the polymer is taken into the solution such that substantially no visible solid material remains. For some combinations of polymer and calcium compound, some solid lumps or other material visible to the naked eye may remain. These may be filtered out before use. For some combinations of polymer and calcium compound, the composition may be a dispersion that would cause no problems, such as clogging, through standard fertiliser systems.

The composition ideally comprises low salt content water, which gives the maximum synergy between the calcium and the polymer, however this does not limit the scope of the invention.

The polymer must be water-soluble and in particular is soluble in an aqueous solution of calcium compound having the same concentration of calcium compound as the final aqueous composition which is desired to be produced. Generally the polymer is substantially linear and is not cross-linked.

The polymer preferably has intrinsic viscosity (IV) of from 8 to 16 dl/g. In this specification intrinsic viscosity is measured by suspended level viscometer at 20° C. in 1 M sodium chloride buffered to pH 7. That is, it is of sufficiently high molecular weight to give a soil stabilisation effect and is not a low molecular weight material which would act as a dispersant.

Preferably IV is at least 8 dl/g, more preferably at least 9 dl/g. It may be up to for instance 30 dl/g but generally we find that the optimum combination of low viscosity of the composition and soil stabilisation performance is given by polymers having IV not more than about 20 dl/g. Particularly preferred IV ranges are from 8 to 16 dl/g, especially 10 to 14 dl/g.

The polymer is formed from water-soluble monomer or monomer blend, usually watersoluble ethylenically unsaturated monomer. The anionic content, i.e. the proportion of anionic monomer in the monomer blend used to form the polymer, is at not more than 40% by weight, preferably not more than 35 or 30% by weight. Particularly preferred polymers have anionic content in the range 2 to 30% by weight.

The monomer blend used to form the polymer preferably comprises at least 2% by weight anionic monomer. This may be any suitable anionic ethylenically unsaturated monomer. It is generally preferred that the anionic monomer is an ethylenically unsaturated carboxylic monomer, in particular acrylic or methacrylic monomer. Salts of acrylic acid are preferred, for instance ammonium or alkali metal, in particular sodium salts.

The polymer may contain small amounts of cationic monomer, for instance up to 20% by weight or 10% by weight but usually the content of cationic monomer is substantially zero.

Generally the anionic monomer is copolymerised with non-ionic monomer, usually ethylenically unsaturated water-soluble non-ionic monomer such as acrylamide or methacrylamide, preferably acrylamide. The monomer blend used to form the polymer comprises at least 65% by weight non-ionic monomer. Particularly preferred polymers have non-ionic content in the range 98 to 65% by weight.

Particularly preferred polymers are copolymers of acrylamide with sodium acrylate.

The calcium compound may be any of those which can be used as soil stabilsers. Water insoluble or partially water soluble calcium compounds which can be used as soil stabilsers include calcium sulphates, calcium oxides, calcium carbonates, calcium phosphate and calcium cyanamide. $CaSO_4 2H_2O$, otherwise known as gypsum, is a calcium sulfate commonly used as a soil stabiliser. CaO in its hydrated form of $Ca(OH)_2$, otherwise known as lime, is a commonly used soil stabiliser. Water soluble calcium compounds which can be used as soil stabilsers include calcium chloride, calcium nitrate, a blend of calcium nitrate with ammonium nitrate and chelated forms of calcium Preferred calcium compounds are water soluble. Preferred water soluble calcium compounds are calcium chloride, calcium nitrate and calcium ammonium nitrate. A particularly preferred water soluble calcium compound is calcium chloride. The calcium compounds may be used alone or in a mixture.

The polymer is included in the composition in an amount such that when the composition is diluted for irrigation, it provides adequate polymer concentration on the soil to give acceptable soil stabilisation performance. Polymer concentration in the aqueous soil treatment composition of the invention is generally from 0.1 to 10% by weight, in particular at least 0.2 or at least 0.5% by weight. Preferably it is at least 0.7% by weight. Often it is not more than 7% by weight, and particularly preferred compositions contain from 0.1 to 2% by weight polymer.

The calcium compound is present in a concentration which provides calcium in a concentration of at least 0.5% by weight based on the total weight of the composition, for instance at least 2% by weight. Preferably it is at least 3% by weight. It can be as high as 13 or 15% by weight but is usually not more than 12% by weight. Preferred concentration range is 4 to 8% by weight, for instance around 6% by weight.

The aqueous composition of the invention can be made in any convenient manner. For instance polymer may be added to water followed by calcium compound or the two may be added simultaneously. Alternatively, calcium compound may be added to a preformed solution of polymer. However, generally it is preferred that the polymer is added to a preformed solution of the calcium compound. In particular it is preferred that the polymer is added in solid form, i.e. powder or bead. It is possible to add it in other forms, such as reverse phase dispersion, but solid is preferred. Essentially any particle size polymer can be used as long as gel blocking during polymer dissolution is avoided. Preferred solids are smaller than 1400 microns and are made in standard manner, for instance by gel or bead polymerisation followed by comminution and if necessary drying.

The polymer, if added as powder, can be added using known systems such as those described in U.S. Pat. No. 4,086,663 and WO94/19095.

Thus in the invention we provide a process for the production of an aqueous composition of the invention comprising providing a preformed aqueous solution of the calcium compound (a) and mixing into it polymer (b) in powder form. The compositions can be prepared at ambient temperature, however the speed of dissolution is increased at higher temperatures. A suitable temperature range for mixing is between 35 and 65 degrees Celsius.

The thus formed composition should have viscosity which renders the composition easy to handle. It should in particular be easy to handle (i.e. preferably pumpable, pourable or sprayable) in the equipment which is presently used for addition of soil stabilisers to irrigation water and for application of concentrated soil stabiliser solution alone to soil. Preferably viscosity is below 4,000 cPs, more preferably not more than 3,000 cPs. In particular it is not more than 2,000 and especially not more than 1,000 cPs. Particularly preferably it is not more than 600 cPs. Particularly preferred compositions have final viscosity of from 50 to 500 cPs. In this specification viscosity is measured using a Brookfield LVT viscometer at 12 rpm using spindle 2.

Thus aqueous composition of the invention may be applied directly to soil as a soil stabiliser composition. However, the composition of the invention is intended particularly as a concentrate for use in irrigation, in which processes it will be diluted and applied to soil areas. Thus it may contain any materials known for inclusion in such compositions. It generally does not contain additional materials such as oxidising agents, reducing agents, soil materials or seed materials.

The invention also provides a soil treatment process comprising irrigating an area of soil with water to which has been added an aqueous soil treatment composition of the invention.

Suitable irrigation processes include drip irrigation, furrow irrigation and spray irrigation. Spray irrigation processes include commonly known processes such as sprinkler irrigation and micro sprinkler irrigation. Sprinkler irrigation includes processes which use overhead, pivot, solid set, hand line and wheel line irrigation systems. Micro sprinkler irrigation includes processes using small individual spray heads placed at the crop site.

In particular the composition is suitable for use in processes of spray irrigation where irrigation water is pumped to a spray manifold and sprayed over a very large crop area, for instance at least one hectare (ha), and even up to 100 ha. Such methods comprise pumping water through feed ducting and a mixing zone to a spray manifold supplying one or more spraying devices by which the water is sprayed onto the crop area to be irrigated, and the aqueous composition of the invention is metered into the water at or before the mixing zone. Processes of this general type are described in our unpublished PCT Application No. PCT/GB98/01763. In that application it is essential to supply polymer in the form of a dispersion of water-soluble polymer particles in a liquid. In the present case the polymer is of course included in the solution of fertiliser which is metered in the standard manner and thus this system is not necessary in the present case. However, other features of the system described in that application can however be applied herein.

The compositions of the invention may also be applied to lawns and soils generally associated with home and amenity gardening, such as flower beds, grass lawns, vegetable patches etc. The compositions are suitable for use in the processes of irrigation which use garden hoses, spray devices, lawn sprinklers, watering cans, drip and trickle systems (which involve applying water on a slow steady basis to the plant's root zones to replace water which is lost by evaporation from the soil and transpiration by the plant) and other apparatus commonly used in this area of gardening.

The invention will now be illustrated with reference to the following examples.

EXAMPLES

In the following examples various polymers were used, as follows:

Polymer A: 50% polyacrylamide dispersed in mineral oil, which has intrinsic viscosity of about 16 dl/g and is formed from monomer of which about 40% by weight is anionic monomer.

Polymer B: Solid grade polyacrylamide, which has intrinsic viscosity of about 16 dl/g and is formed from monomer of which about 15% by weight is anionic monomer.

Polymer C: Solid grade polyacrylamide, which has intrinsic viscosity of about 13 dl/g and is formed from monomer of which about 28% by weight is anionic monomer.

Polymer D: Solid grade polyacrylamide, which has an intrinsic viscosity of about 13 and is formed from monomer of which about 4% by weight is anionic monomer.

Polymer E: Solid grade polyacrylamide, which has an intrinsic viscosity of about 10 and is formed from monomer of which about 10% by weight is anionic monomer.

The calcium solutions used in the following examples were prepared from Calcium Chloride, and the percentages refer to the concentration of calcium. For example, the 6% calcium solution was prepared from 16.61% w/w of calcium chloride.

Example 1

The synergy of calcium and polyacrylamide was shown by a flocculation test, wherein a calcium solution and a polyacrylamide solution were tested first individually and then in combination. The compositions tested contained 7.4 ppm of polyacrylamide and/or 740 ppm of calcium chloride. For instance, 0.37 g of a 1% polyacrylamide solution was made up to 500 g with de-ionised water, resulting in a 7.4 ppm polyacrylamide composition.

Each of the following treatments were individually added to 450 g of de-ionised water in a measuring cylinder, then adding de-ionised water up to 500g. The test was performed using de-ionised water, to simulate irrigation with very low salt content melt water which is used commonly in the northern states of the US. Low salt content water gives the maximum synergy between the calcium and the PAM.

The cylinder was inverted several times in order to mix the composition, then 10 g of a loamy sand soil having particle size less then 500 microns were added and the cylinder was shaken vigorously for twenty seconds. The mixture was left to stand for two minutes, then an aliquot from a predetermined depth was taken and the turbidity of the aliquot measured using a Hach 2100P turbidimeter.

The results are shown in the following table 1:

TABLE 1

| Treatment | Average Turbidity (NTU) |
|---|---|
| Control | 762 |
| Polymer A | 759 |
| Polymer B | 473 |
| Polymer C | 575 |
| 6% Calcium solution | 513 |
| 12% Calcium solution | 461 |
| Polymer C in 6% Calcium solution | 137 |
| Polymer C in 12% Calcium solution | 116 |
| Polymer D | 198 |
| Polymer E | 448 |
| Polymer D in 6% Calcium solution | 52 |
| Polymer F in 6% Calcium solution | 75 |

The clearer the water, i.e. the lower the turbidity measurement, then more efficient the flocculation. These results indicate that an effective synergy exists between calcium and polyacrylamide with respect to flocculation ability.

It should be noted that although the lowest ionic content polymer has given the best performance in the above test this is unlikely to be the case with all soil and water permutations.

Example 2

The following example aims to demonstrate that the present compositions are an effective means of reducing soil erosion, improving soil structure and improving water infiltration on sprinkler irrigated crops. This was achieved by a comparison with a polyacrylamide when used alone.

Two pivot irrigation systems were treated with the following two compositions.

1) Polymer C in 6% Calcium solution was applied at 10 gallons per acre.
2) Polymer A was applied at 0.25 gallons per acre.

Both treatments were injected neat into the pivot irrigation system, and the only mixing was due to the turbulence in the pipeline. Progressive cavity pumps were used, and calibrated using calibration tubes.

Both treatments were applied with half an inch of water per acre. There were no injection problems or plugging with either product. Ninety acres were treated in each pivot system, with thirty acres being irrigated without chemical treatment. Both pivot systems were planted to sugar beets, and had been cultivated prior to the test.

Both fields were rolling with significant slopes in some areas. These slopes are a factor for soil conditioning, as water tends to seal allowing erosion and poor water infiltration.

The following results were taken after one week, and were taken randomly from each field. The results are shown in tables 2 and 3:

TABLE 2

| Field 1 | | | | | |
|---|---|---|---|---|---|
| Polymer A | | | Control (Water) | | |
| Crust | Structure | Infiltration | Crust | Structure | Infiltration |
| 5 | 4 | 6 | 2 | 2 | 2 |
| 6 | 6 | 5 | 3 | 4 | 3 |
| 6 | 6 | 6 | 2 | 3 | 2 |

TABLE 3

| Field 2 | | | | | |
|---|---|---|---|---|---|
| Polymer C in 6% Calcium solution | | | Control (Water) | | |
| Crust | Structure | Infiltration | Crust | Structure | Infiltration |
| 7 | 6 | 7 | 3 | 2 | 4 |
| 7 | 5 | 5 | 4 | 3 | 2 |
| 8 | 7 | 8 | 2 | 3 | 3 |

A rating of 10 was assigned to ideal seedbed conditions which are considered to include loose, friable soil structure, elimination of crusting and improved water infiltration or moisture (elimination of water run off).

A rating of 1 was assigned to undesirable conditions which are considered to be hard soil structure, compacted, poor water infiltration and crusted.

The results shown in tables 2 and 3 show definite improvements using the present composition.

What is claimed is:

1. An aqueous soil treatment composition comprising water and,
   (a) a calcium compound,
   (b) a water-soluble anionic polymer which has intrinsic viscosity of less than 30 dl/g and is formed from water-soluble monomer or monomer blend of which less than 40% by weight is anionic monomer.

2. A composition according to claim 1 which is a solution.

3. A composition according to claim 1 in which the polymer (b) has intrinsic viscosity of less than 20 dl/g.

4. A composition according to claim 1 in which the polymer (b) is formed from water-soluble monomer or monomer blend comprising from 2 to 35% by weight anionic monomer.

5. A composition according to claim 1 in which the polymer (b) is formed from water-soluble monomer blend comprising from 2 to 35% by weight anionic monomer and from 98 to 65% by weight non-ionic monomer.

6. A composition according to claim 1 in which the polymer (b) is a copolymer of acrylamide with an alkali metal salt of acrylic acid.

7. A composition according to claim 1 in which the calcium compound (a) is calcium chloride.

8. A composition according to claim 1 in which the polymer (b) is present in an amount of from 0.1 to 2% by weight.

9. A composition according to claim 1 in which the calcium compound (a) is present in an amount which provides calcium in a concentration of from 0.5 to 15% by weight based on the total weight of the composition.

10. A composition according to claim 1 which has a viscosity of not more than 2000 cPs.

11. A composition according to claim 1 in which the polymer (b) has been added to the composition in the form of a powder.

12. A soil treatment process comprising irrigating an area of soil with water to which has been added an aqueous soil treatment composition as defined in claim 1.

13. A process according to claim 12 in which the irrigation is by furrow irrigation, drip irrigation or spray irrigation.

14. A process according to claim 12 in which water is pumped through feed ducting and a mixing zone to a spray manifold supplying one or more spraying devices by which the water is sprayed onto a crop area and the aqueous soil treatment composition is metered into the water at or before the mixing zone.

15. A process according to claim 12 in which the irrigation is used in home and amenity gardening.

16. A process according to claim 15 in which the process comprises irrigating via garden hoses, spray devices, lawn sprinklers, watering cans, drip systems and trickle systems.

17. A method for the production of an aqueous soil treatment composition as defined in claim 1 comprising providing an aqueous solution of calcium compound (a) and mixing with it polymer (b) in powder form.

18. A composition as claimed in claim 1 in which the polymer (b) has an intrinsic viscosity of at least 8 dl/g.

* * * * *